3,055,918
α-EPOXY UNSATURATED COMPOUNDS
Percy L. Julian and John W. Cole, Oak Park, Ill., assignors, by mesne assignments, to Chas. Pfizer & Co., Inc., New York, N.Y., a corporation of Delaware
No Drawing. Filed Feb. 25, 1954, Ser. No. 412,664
16 Claims. (Cl. 260—397.4)

The present invention relates to the reduction of epoxy compounds, and particularly relates to the reduction of the epoxy group of compounds in which the epoxy group is conjugated with an unsaturated structure, such as in carbon-carbon, carbonyl and nitrile double bonds, aromatic double bonds, and the like.

It is known to react α-epoxy ketones with reducing agents. For example, α-epoxy ketones of the steroid series have been treated with lithium aluminum hydride and related metallic hydrides to form α-ketol derivatives. Treatment of such α-epoxy ketones with hydrogen bromide and reductive removal of the bromine from the resulting vicinal bromohydrin with Raney nickel is also known and likewise leads to α-ketols.

Those treatments, however, lead to ketols in which the hydroxy group is α to the keto group.

It is accordingly an object of the present invention to provide a new method for reducing epoxy groups.

A further object is to provide a method for producing compounds containing a hydroxy group in the β-position to an unsaturated group.

Another object is to provide a method for producing β-ketols.

An additional object is to provide a method whereby the double bond of certain epoxidized bond compounds is restored.

Still another object is to provide a process whereby an epoxy group is converted to an ethylenic group.

Other objects will be apparent from the following description of the invention.

We have now found that chromous salts react in a surprisingly different manner to those known reducing agents with α-epoxy ketones. For example, in the prior art processes, the reduction results in α-hydroxy ketones, see Equation 1.

Equation 1: 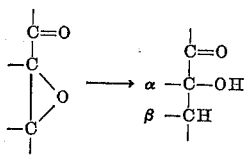

whereas, with chromous salts the reaction proceeds

Equation 2: 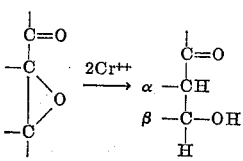

to give the isomeric β-hydroxy ketones, see Equation 2. Depending upon the particular conditions of the reaction, the β-hydroxy ketone is more or less dehydrated to an α,β-unsaturated ketone.

The general nature of the novel reaction is illustrated by the conversion of 4-methyl-3,4-epoxypentan-2-one to mesityl oxide by means of chromous chloride.

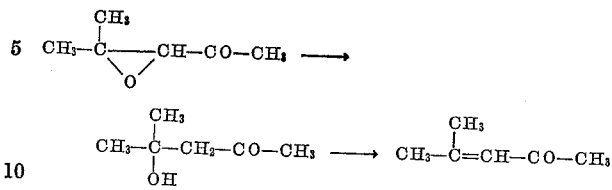

Similarly, benzal acetophenone oxide is rapidly reduced by chromous salts giving a mixture of products from which benzalacetophenone can be isolated. This reaction is complicated by the reactivity of benzalacetophenone itself, and hence the yield hereof is understandably low.

Thus, although by known reduction methods, 16,17-epoxy-progesterone is converted to 17α-hydroxy progesterone, by our new process, we now have found that chromous salts readily reduce 16,17-epoxy-progesterone to 16α-hydroxy progesterone. The latter, in the presence of mineral acid, is readily dehydrated to 4,16-pregnadiene-3,20-dione ("16-dehydro progesterone"). This dehydration occurs only slowly in the presence of excess chromous chloride and even less readily in the presence of chromous acetate. Evidently the dehydration of the 16-hydroxy-20-keto steroids is catalyzed by mineral acid. As indicated in the examples below, when the dehydrated product is desired, it is preferable to heat the total crude reduction product with mineral acid to obtain complete dehydration.

Our invention is preferably carried out by adding an aqueous solution of the chromous salt to a solution of the organic compound in the presence of an acid. If desired, organic solvents, such as acetone, methyl alcohol and the like, can be used to assist in maintaining the organic compound in solution. The reaction is rapid and in many instances is practically complete in a matter of minutes at room temperature. The color change which occurs can usually be taken as an indication of the completeness of the reaction. Thereafter, the products of the reaction are isolated in the usual maner, e.g., by watering out and extraction with an immiscible solvent. The crude product, if desired to be obtained as the α,β-unsaturated ketone derivative, is treated with a dilute mineral acid organic solvent solution for a short time, e.g., 30 minutes, at reflux temperature. If the hydroxy ketone is desired, it is obtained by purification, e.g. fractional crystallization, of the crude reduction product.

The following examples will illustrate the process of our invention:

*Example 1*

A solution of 2 grams of 4-methyl-3,4-epoxypentane-2-one in 40 ml. of water was added to 80 ml. of 0.6 N chromous chloride (Inorganic Synthesis III, p. 148, McGraw-Hill). The temperature was held at about 23° C. and the mixture was maintained under an atmosphere of carbon dioxide. The blue solution turned deep green after several minutes. The mass was permitted to stand for thirty minutes and then it was extracted with 45 ml. of methylene chloride in three equal portions. The extract was washed with water and the solvent evaporated. The residue was distilled yielding 1.1 g. of mesityl oxide, B.P. 123 to 132° C., $E_{max}$ at 232 m$\mu$=8,400, in ether.

From the boiling range and ultraviolet data, the presence of both isomers of mesityl oxide was confirmed (see Gray et al., J.A.C.S. 69, 1630 (1947)), as was to have been expected of material formed in an acidic medium.

Example 2

To a solution of 5.8 grams of 16,17-epoxy-4-pregnen-21-ol-3,20-dione in 150 ml. of glacial acetic acid under an atmosphere of carbon dioxide was added a mixture of 65 ml. of 0.6 N chromous chloride and 65 ml. of glacial acetic acid. The mass was initially at 24° C., but during the addition its temperature rose to 27° C. After 5 minutes, the mass was diluted with water and methylene chloride. After separation of the methylene chloride layer, the aqueous layer was extracted with three 40 ml. portions of methylene chloride. The combined extracts were washed with successive portions of water, aqueous sodium bicarbonate and water. Thereafter, the washed extract was concentrated to yield 5.2 grams of crude solid, M.P. 134 to 160° C. This was refluxed for 10 minutes with 20 ml. of acetone and 200 ml. of anhydrous ether. After filtration of the insoluble matter and washing the filtered material with 40 ml. of ether, 1.1 grams of a white solid melting at 170 to 190° C. was obtained. The filtrate was passed over a column of 20 grams of silica and rinsed through with 200 ml. of ether. The filtrate after this treatment was evaporated to dryness and the residue, 3.3 grams, after recrystallization from ethyl acetate, yielded 2.6 grams of product, M.P. 151° to 152° C. Repeated recrystallization gave material melting at 158° C., $\alpha_D + 148°$ (C=1.0 in chloroform).

$E_{max}$ at 234 m$\mu$=27,400 in ether
at 241 m$\mu$=25,200 in methanol

This material was identified as 4,16-pregnadien-21-ol 3,20-dione acetate.

*Analysis.*—Calculated for $C_{23}H_{30}O_4$: C=74.55, H=8.16. Found: C=74.26, 74.50, H=7.94, 8.24.

The insoluble higher melting fractions are crude 4-pregnene-16$\alpha$,21-diol-3,20-dione 21-acetate, which by dehydration can be converted to the 4,16-pregnadienol-dione acetate, as described in Example 3 below.

Example 3

1.1 grams of the 170° to 190° C. melting material obtained as above described was combined with 0.7 g. of similar material obtained by washing the silica column of the above experiment with acetone, and the mixture was recrystallized from acetone. The purified product, 4-pregnene-16$\alpha$,21-diol-3,20-dione 21-acetate, was obtained in the form of white needles melting at 213° to 214° C., $\alpha_D + 123°$ (C=0.50 in acetone), $E_{max}$ at 241 m$\mu$=16,300 in methanol. The infrared absorption pattern for this material exhibited a peak at 2.9$\mu$, indicating a hydroxy group.

*Analysis.*—Calculated for $C_{23}H_{32}O_5$: C=71.11, H=8.30. Found: C=70.94, H=8.22.

The 16$\alpha$-hydroxy product of this example was refluxed for one hour in acetone to which was added 0.5% by weight of hydrochloric acid and 1% by weight of water. Thereafter, the solvent was evaporated to a low volume and water was added to incipient crystallization. Thusly, the 4,16-diene, M.P. 148° to 151° C., identical with the product of Example 2, was obtained.

By heating at reflux temperature for twenty minutes 4-pregnene-16$\alpha$,21-diol-3,20-dione 21-acetate in aqueous methanol containing sodium bicarbonate, and concentrating in vacuo the hydrolysis mixture, there was obtained 4-pregnene-16$\alpha$,21-diol-3,20-dione. This material after recrystallization from acetone was obtained as prisms melting at 203° to 204° C. Treatment of this hydrolyzed product with acetic anhydride and pyridine gave 4-pregnene-16$\alpha$,21-diol-3,20-dione diacetate, melting at 150° to 153° C.

In the same manner, 16,17-epoxy-5-pregnene-3$\beta$,21-diol-20-one diacetate; 16,17-epoxy-pregnane-3$\alpha$,21-diol-11,20-dione 21-hemisuccinate; 16,17-epoxy-5,7-pregnadiene-3$\beta$,21-diol-20-one diacetate; and 16,17-epoxy-pregnane-3$\alpha$,12,21-triol-20-one triacetate can be converted into either 5-pregnene-3$\beta$,16$\alpha$,21-triol 3,21-diacetate; pregnane-3$\alpha$,16$\alpha$,21-triol-11,20-dione 21-hemisuccinate; 5,7-pregnadiene-3$\beta$,16$\alpha$,21-triol-20-one 3,21-diacetate; and pregnane-3$\alpha$,12,16$\alpha$,21-tetrol-20-one 3,12,21-triacetate, respectively; or into the corresponding 16,17-dehydrated products; 5,16-pregnadiene-3$\beta$,21-diol-20-one diacetate; 16-pregnene-3$\alpha$,21-diol-11,20-dione 21-hemisuccinate; 5,7,16-pregnatriene-3$\beta$,21-diol-20-one diacetate; and 16-pregnene-3$\alpha$,12,21-triol-20-one triacetate, respectively. The corresponding 16$\alpha$-hydroxy unesterified compounds can be prepared from the 16$\alpha$-hydroxy esters by alkaline hydrolysis under mild conditions.

Example 4

To a solution of 4.0 grams of 16,17-epoxy-4-pregnene-21-ol-3,20-dione acetate, in 100 ml. glacial acetic acid covered with a $CO_2$ atmosphere, was added a mixture of 100 ml. of 0.8 N chromous chloride, 50 ml. of glacial acetic acid and 4 ml. of 20° Bé. hydrochloric acid. The reaction is quite vigorous; hence, the addition was made portionwise with the reaction vessel partially immersed in a running water bath. The mixture was permitted to stand for about 16 hours at about 23° C. Thereafter, water is added to the mixture to precipitate the product which was separated by filtration; 2.2 g. crude, M.P. 172° to 184° C. Recrystallization from acetone gave 1.2 g. of 4,16-pregnadiene-3,20-dione, M.P. 186° to 189° C.; $E_{max}$ at 240 m$\mu$=25,000 in methanol.

*Analysis.*—Calculated for $C_{21}H_{28}O_2$: C=80.73; H—9.03. Found: C—80.74; H—9.17.

A mixed melting point determination with an authentic specimen of 4,16-pregnadiene-3,20-dione gave no depression.

Example 5

In an atmosphere of carbon dioxide, a solution of 5 grams of 16,17-epoxy-4-pregnene-3,20-dione in 100 ml. of acetic acid was treated with 60 ml. of aqueous 0.8 N chromous chloride, added in 2 minutes. The temperature rose rapidly from 26° to 29° C., and the color of the mixture changed rapidly from blue to green. After 30 minutes, the mass was drowned in water and the resulting slurry was filtered. Thusly, 3.1 grams of crude 4,16-pregnadiene-3,20-dione, M.P. 170° to 183° C., was obtained. After recrystallization from acetone, the product melted at 188° to 190° C. and gave no depression in the melting point of an authentic specimen of 4,16-pregnadiene-3,20-dione.

The aqueous acetic acid filtrate obtained above was extracted with chloroform. The extract was washed with successive portions of water, aqueous sodium bicarbonate and water. The washed extract was evaporated to dryness and the residue crystallized from anhydrous ether. The crude product (1.3 grams, M.P. 221° to 225° C.) was recrystallized from a mixture of acetone and ether yielding prisms of 4-pregnen-16$\alpha$-ol-3,20-dione ("16$\alpha$-hydroxyprogesterone") melting at 226° to 227° C., $\alpha_D + 119°$ (C=0.5 in acetone) $+160°$ (C=0.5 in chloroform), $E_{max}$ at 241 m$\mu$=16,400 in methanol. The infrared absorption pattern exhibited sharp hydroxyl absorption at 2.9$\mu$.

*Analysis.*—Calculated for $C_{21}H_{30}O_3$: C=76.32; H=9.10. Found: C=76.30; H=9.17.

This experiment illustrates the stepwise character of this reaction. If instead of watering out the diene portion of the product, the reaction mass was extracted with chloroform, concentrated to remove the bulk of the chloroform and the residue treated with acetone containing hydrochloric acid at the reflux temperature for one hour, a 90% yield of pregnadiendione was obtained.

Under normal conditions, the reaction can be interrupted prior to the dehydration stage. Thus, a mixture of 2.0 grams of 16,17-epoxy-4-pregnene-3,20-dione, 4.4 grams of chromous acetate, 45 ml. of glacial acetic acid and 15 ml. of water was agitated under $CO_2$ and at about 23° C. for 14 hours. After dilution of the mixture with water, it was extracted with methylene chloride. The extract was concentrated and then crystallized from 6 ml. of acetone. In this manner, 1.35 g. of crude 16α-hydroxy progesterone, M.P. 218° to 222° C., was obtained. Recrystallization of the crude material from a mixture of acetone and ether gave a product melting at 226° C.

In the same manner, 16,17-epoxy-4-pregnene-6-ol-3,20-dione; 16,17-epoxy-4-pregnene-7-ol-3,20-dione; 16,17-epoxy-4-pregnene-11-ol-3,20-dione and 16,17-epoxy-4-pregnene-12-ol-3,20-dione can be converted into either 4-pregnene-6,16-diol-3,20-dione; 4-pregnene-7,16-diol-3,20-dione; 4-pregnene-11,16-diol-3,20-dione and 4-pregnene-12,16-diol-3,20-dione, respectively; or into the corresponding 16,17-dehydrated products.

Example 6

To a 23° C. solution of 6.6 grams of 16,17-epoxy-5-pregnen-3β-ol-20-one acetate in 240 ml. of glacial acetic acid was added 120 ml. of 0.6 N chromous chloride. The blue-green mixture was held under an atmosphere of $CO_2$ for 30 minutes and then extracted with methylene chloride. The extracts were washed with water and then concentrated to a low volume. The mass was diluted with 60 ml. of acetone and 0.5 ml. of 10% aqueous hydrochloric acid and the mixture was boiled under reflux for one hour. After being concentrated to 30 ml. the mass was extracted with methylene chloride. After being washed with water, the extract was evaporated to dryness. The residue was recrystallized from ethyl acetate to give a product melting at 173° to 174° C. identical in all respects to an authentic specimen of 5,16-pregnen-dien-3β-ol-20-one acetate.

Example 7

In an atmosphere of carbon dioxide and at 20° C., 80 ml. of 0.6 N aqueous chromous chloride was added to a solution of 7.44 grams of 16,17-epoxy-5-pregnen-3β-ol-20-one acetate in 150 ml. of acetone and 20 ml. of water. The blue color of the chromous chloride solution quickly turned to green as the solutions were mixed, and after three minutes the mixture was diluted with ether and then extracted with methylene chloride. After washing the extract, it was evaporated to dryness yielding a crystalline residue weighing 7.4 g. and melting at 158° to 162° C. The crude product, a mixture of the 5,16-diene and the 16α-hydroxy products, was separated by dissolving it in methylene chloride and passing the solution through a column of silica. Elution of the absorbed material with ether gave in the initial fractions 5,16-pregnadien-3β-ol-20-one acetate, M.P. 169° to 173° C., and in the succeeding fractions 5-pregnene-3β,16α-diol-20-one-3 acetate, M.P. 169° to 172° C. A mixture of these two products melted at about 8° C. lower than either. The 16α-hydroxy product, after recrystallization from benzene, melted at 172° C., its U.V. absorption pattern was low and flat in the 240 mμ region, while in the infrared the product exhibited sharp hydroxyl absorption at 2.9μ.

*Analysis.* — Calculated for $C_{23}H_{34}O_4$: C=72.80; H=0.09. Found: C=74.04; H=9.21.

An additional proof of the structure of this material was obtained by refluxing an acetone solution of the material in the presence of 10% aqueous hydrochloric acid and working up the reaction mixture as described above. In this manner, 5,16-pregnadien-3β-ol-20-one acetate, M.P. 172° to 174° C., was obtained. The product showed in the ultraviolet absorption pattern an $E_{max}$ 239 mμ=9300 (methanol).

Example 8

To a solution of 0.5 gram of 4,5-epoxypregnan-3,20-dione, Colton et al., J. Biol. Chem. 194, 235 (1952), in 25 ml. of glacial acetic acid ($CO_2$ atmosphere) was added 10 ml. of 0.8 N aqueous chromous chloride. The first additions of chromous chloride rapidly turned from blue to green upon admixture with the acetic acid solution, and the temperature of the mass rose from about 20° to 30° C. After standing for one hour at 30° C., the mass was diluted with water and extracted with methylene chloride. The extract was washed and evaporated to yield 0.39 gram of crude, which after recrystallization from ethanol melted at 128° to 129° C. A mixed melting point determination of the product with an authentic specimen of progesterone gave no depression in the melting point.

Example 9

A mixture of 12 ml. of 0.8 N aqueous chromous chloride and 3 ml. of 10% aqueous hydrochloric acid was added to a solution of 0.9 gram of 4,5-epoxy-coprostan-3-one, Plattner et al., Helv. Chem. Acta. 31, 1822 (1948), in 60 ml. of acetic acid, in an atmosphere of carbon dioxide. The mass was permitted to stand at 30° C. for one hour and subsequently worked up as described above. Thusly, 0.77 g. of cholestenone, M.P. 77° C., $E_{max}$ 240 mμ=13,300 (methanol) was obtained.

Example 10

A solution of 22 grams of benzalacetophenone oxide in 50 ml. of acetone at 20° C. was agitated under carbon dioxide as a mixture of 40 ml. of 0.5 N aqueous chromous chloride and 4 ml. of 10% aqueous hydrochloric acid was added. The blue mixture rapidly changed to green, and after five minutes it was diluted with water. Ether extraction of the water-insoluble product, and recrystallization of the ether-soluble material from methanol, gave 0.3 gram of benzalacetophenone.

The ether-insoluble portion of the reaction product was recrystallized from a mixture of acetone and ether. The white needles thusly obtained melted at 272° to 273° C., and was identified as 1,4-dibenzoyl-2,3-diphenylbutane which has been obtained from benzalacetophenone by zinc reduction, Harries et al., Ann. 296, 327 (1897), or by reduction with chromous chloride, Conant et al., J.A.C.S. 48, 1016 (1926).

Example 11

To a solution of five grams of styrene oxide in 80 ml. of glacial acetic acid under carbon dioxide was added 110 ml. of 0.8 N aqueous chromous chloride. The mixture was permitted to stand for about 16 hours, diluted with water, and an oily upper layer separated. This material was washed with water and dried by centrifuging. It was identified by its ultraviolet absorption pattern, $E_{max}$ 247 mμ=10,100 (methanol) as styrene. Under milder acid conditions, the dehydration is retarded and β-phenyl ethanol is recoverable from the mixture.

Example 12

Verbenone oxide, Simonsen, The Terpenes, vol. 2, page 237 (1949), when treated with chromous chloride as in Example 1 is converted to verbenone.

The above illustrative examples will demonstrate the broad applicability of our novel process to α-epoxy ketones. Although the process is of prime interest in the realm of steroids, it is not intended to be so limited as our disclosure and examples have indicated. Thus, the examples illustrating the conversion of benzalacetophenone oxide to benzalacetophenone and of styrene oxide to styrene illustrate the applicability of our procedure to aromatic epoxy compounds, and the disclosure of the conversion of 4-methyl-3,4-epoxy-pentan-2-one to mesityl oxide is illustrative of its use in the aliphatic series, while the treatment of verbenone oxide is illustrative of the cycloalkyl series of compounds.

Further, it will readily be seen from the above examples that a new method for the protection of carbon-to-carbon double bonds adjacent to oxo-substituents has been disclosed. Thus, the preparation of 4,16-pregnadien-3,20-dione, which formerly involved a relatively laborious and low yield Oppenauer-type oxidation of 5,16-pregnadien-3β-ol-20-one, is now improved by the simple conversion of that intermediate to the 16,17-epoxide, chromic acid oxidation of the the 3-hydroxy group and reduction of the epoxide linkage to give in excellent yield 16-dehydroprogesterone. The process also, of course, provides a method for producing β-hydroxy unsaturated compounds, whether those are β-ketols, β,γ-unsaturated alcohols or other unsaturates having a hydroxy group β to the double bond. These intermediates are themselves useful in that they, too, can be used as starting materials for other chemical treatments and thereafter dehydrated. This process also provides a facile means for producing the 16-hydroxy-20-keto steroids which are of interest because of their relationship to adrenal tumor metabolism.

The reduction step of the reaction is effected by chromous ions preferably in an acid medium. Any source of chromous ions can be used. Thus, in addition to the chromous chloride and acetate used in the above examples, such other chromous salts as chromous bromide, chromous sulfate, chromous propionate and the like can be used. We generally prefer to carry out the first step of the process, and especially in those instances wherein the desired end product is a 16α-hydroxy steroid, in the presence of an organic acid such as acetic acid, propionic acid and the like. Where the end product desired is the conjugated product, any acid, both organic and non-oxidizing aqueous mineral acids, preferably the latter, can be used. It is known that the halogen acids react with the epoxide to form halohydrins which do not react with chromous salts, the velocity of this reaction being proportionate to the strength of the acid. Accordingly, such strong concentrations of halogen acid as would result in substantial halohydrin formation should be avoided. In the step of dehydrating the hydroxy derivatives, any non-oxidizing mineral acid can be used as the source of hydrogen ions. Thus, instead of hydrochloric acid, sulfuric acid, phosphoric acid and the like can be used.

Our invention represents a novel approach to the reduction of α-epoxy ketones. As has been indicated above, our invention is a broad scope and many variations within said scope of the numerous illustrations provided herein will be obvious to the skilled artisan.

Also as a part of the invention disclosed herein, applicants have discovered that the 16α-hydroxy group is resistant to dehydration under mildly alkaline conditions, and this characteristic enables esterified groups elsewhere in the molecule to be hydrolyzed, under alkaline conditions, without removal of the 16α-hydroxy group.

Having described the invention, what is claimed is:

1. The process which comprises reacting an α-epoxy unsaturated compound in which the epoxy group is alpha to the unsaturated linkage with a water soluble chromous salt in the presence of water under acidic non-oxidizing conditions.
2. The process of claim 1 in which the α-epoxy unsaturated compound is an α-epoxy aromatic compound.
3. The process of claim 1 in which the unsaturated group of the α-epoxy unsaturated compound is a carbon-carbon double bond.
4. The process of claim 1 in which the α-epoxy unsaturated compound is an α-epoxy-ketone.
5. The process of claim 4 in which the starting material is epoxy verbenone.
6. The process which comprises reacting an α-epoxy-keto steroid in which the epoxy group is alpha to the carbonylic double bond with a water soluble chromous salt in the presence of water under acidic non-oxidizing conditions.
7. The process of claim 6 in which the epoxy-keto steroid is a steroid of the pregnane series.
8. The process of claim 6 in which the starting steroid is a 16,17-epoxy-20-keto steroid of the pregnane series.
9. The process of claim 6 in which the starting material is a 16,17-epoxy steroid of the pregnane series further characterized in that the additional substituent on the 17-carbon atom is the acetyl group.
10. The process which comprises reacting an α-epoxy-keto steroid in which the epoxy group is alpha to the carbonylic double bond with a water soluble chromous salt in the presence of water and a carboxylic acid under non-oxidizing conditions.
11. The process of claim 10 in which the starting steroid is a 16,17-epoxy-20-keto steroid of the pregnane series.
12. The process of claim 10 in which the starting material is a 16,17-epoxy steroid of the pregnane series further characterized in that the additional substituent on the 17-carbon atom is the acetyl group.
13. The process which comprises reacting an α-epoxy-keto steroid in which the epoxy group is alpha to the carbonylic double bond with a water soluble chromous salt in the presence of water and a carboxylic acid under non-oxidizing conditions, and treating the resulting β-hydroxy-keto steroid with a non-oxidizing mineral acid to form an α,β-unsaturated keto steroid.
14. The process of claim 13 in which the starting material is a 16,17-epoxy steroid of the pregnane series further characterized in that the additional substituent on the 17-carbon atom is the acetyl group.
15. The process of claim 13 in which the starting material is 16,17-epoxy-5-pregnene-3β-ol-20-one acetate.
16. 5-pregnene-3β,16α-diol-20-one-3 acetate.

References Cited in the file of this patent

UNITED STATES PATENTS

| | | |
|---|---|---|
| 2,180,095 | Strassberger et al. | Nov. 14, 1939 |
| 2,230,772 | Bockmuhl | Feb. 4, 1941 |
| 2,288,854 | Stavely | July 7, 1942 |
| 2,291,643 | Marker | Aug. 4, 1942 |
| 2,294,433 | Westphal et al. | Sept. 1, 1942 |
| 2,352,851 | Marker | July 4, 1944 |
| 2,395,338 | Marker | Feb. 19, 1946 |
| 2,656,364 | Hershberg | Oct. 20, 1953 |
| 2,666,770 | Wall | Jan. 19, 1954 |
| 2,708,201 | Dodson et al. | May 10, 1955 |
| 2,709,705 | Perlman et al. | May 31, 1955 |
| 2,719,855 | Nathan et al. | Oct. 4, 1955 |
| 2,745,852 | Ehrhart et al. | May 15, 1956 |
| 2,752,339 | Julian et al. | June 26, 1956 |
| 2,816,108 | Julian et al. | Dec. 10, 1957 |
| 2,820,030 | Julian et al. | Jan. 14, 1958 |

FOREIGN PATENTS

| | | |
|---|---|---|
| 1,060,639 | France | Apr. 5, 1954 |

OTHER REFERENCES

Meyer et al.: Helv. Chim. Acta 30, 1508–1522 (1947).

Hirschmann et al.: J. Biol. Chem., vol. 184, pages 259–82 (1950) (C.A. 44:9550).

Hirschmann et al.: J.A.C.S., vol. 75, pages 4862–3, Oct. 5, 1953.

Vischer et al.: Helv. Chim. Acta., vol. 37, pages 321–6 (February 1, 1954).

Fieser et al.: Natural Products Related to Phenanthrene, Third Edition, 1949, pages 124, 125, 126, 407, 444, 445, 456, 457.

Cole et al.: Jour. of Org. Chem., vol. 19, pages 131 to 138 (February 1954).